(12) United States Patent
Smith et al.

(10) Patent No.: US 12,078,088 B2
(45) Date of Patent: Sep. 3, 2024

(54) COMBINED CYCLE POWER PLANTS WITH EXHAUST GAS RECIRCULATION

(71) Applicant: GENERAL ELECTRIC COMPANY, Schenectady, NY (US)

(72) Inventors: Raub Warfield Smith, Ballston Lake, NY (US); Majed Sammak, Dubai (AE)

(73) Assignee: GE INFRASTRUCTURE TECHNOLOGY LLC, Greenville, SC (US)

( * ) Notice: Subject to any disclaimer, the term of this patent is extended or adjusted under 35 U.S.C. 154(b) by 0 days.

(21) Appl. No.: 17/856,401

(22) Filed: Jul. 1, 2022

(65) Prior Publication Data

US 2024/0003270 A1   Jan. 4, 2024

(51) Int. Cl.
*F01K 23/10* (2006.01)
*F01K 23/08* (2006.01)
*F02C 6/04* (2006.01)

(52) U.S. Cl.
CPC ............. *F01K 23/08* (2013.01); *F01K 23/10* (2013.01); *F02C 6/04* (2013.01); *F05D 2220/31* (2013.01); *F05D 2220/32* (2013.01); *F05D 2220/72* (2013.01); *F05D 2220/74* (2013.01); *F05D 2260/213* (2013.01)

(58) Field of Classification Search
CPC .... F01K 23/10; F02C 7/04; F02C 6/18; F02C 1/06; F02C 3/30; F02C 6/00; F02C 6/02; F05D 2220/31; F05D 2220/32
See application file for complete search history.

(56) References Cited

U.S. PATENT DOCUMENTS

| | | | |
|---|---|---|---|
| 8,113,764 B2* | 2/2012 | Hernandez | F01D 11/06 415/168.2 |
| 8,408,006 B2 | 4/2013 | Li et al. | |
| 9,670,841 B2 | 6/2017 | Mittricker et al. | |
| 9,951,658 B2* | 4/2018 | Vaezi | F02C 6/18 |
| 11,313,252 B2* | 4/2022 | Rechtman | F01K 13/006 |
| 2011/0302922 A1* | 12/2011 | Li | F02C 3/34 60/645 |
| 2015/0000293 A1* | 1/2015 | Thatcher | F02C 7/042 60/39.52 |

(Continued)

FOREIGN PATENT DOCUMENTS

| CN | 110905662 A | 3/2020 |
|---|---|---|
| EP | 2107930 B1 | 4/2012 |

*Primary Examiner* — Thuyhang N Nguyen
(74) *Attorney, Agent, or Firm* — Armstrong Teasdale LLP (57) ABSTRACT

A combined cycle power plant including a gas turbine engine having a compressor inlet and a turbine outlet that is configured to discharge a first exhaust gas stream therefrom. A heat recovery steam generator is configured to receive the first exhaust gas stream, extract heat from the first exhaust gas stream to make steam, and discharge a second exhaust gas stream therefrom. A steam turbine is configured to discharge a steam stream therefrom, a carbon capture system is configured to receive the steam stream, a recirculation blower is configured to pressurize a portion of the second exhaust gas stream for recirculation towards the compressor inlet, and an air inlet blower is configured to pressurize an airflow stream channeled towards the compressor inlet, such that a pressurized mixed flow stream, formed from the portion of the second exhaust gas stream and the airflow stream, is received at the compressor inlet.

17 Claims, 6 Drawing Sheets

(56) References Cited

U.S. PATENT DOCUMENTS

| | | | |
|---|---|---|---|
| 2015/0198089 A1* | 7/2015 | Muthaiah | F02C 3/04 60/39.17 |
| 2015/0214879 A1* | 7/2015 | Huntington | F02C 6/00 290/40 B |
| 2016/0376958 A1* | 12/2016 | Davis, Jr. | F01K 23/103 60/39.5 |
| 2018/0216532 A1* | 8/2018 | Smith | F02C 7/10 |

* cited by examiner

COMBINED CYCLE POWER PLANTS WITH EXHAUST GAS RECIRCULATION

BACKGROUND

The present disclosure relates generally to power generation systems and, more specifically, to systems that use pressurized exhaust gas recirculation to enhance plant output.

At least some known power plants generate energy derived from combusting carbon and hydrogen-containing fuels such as, coal, oil, peat, waste, biofuel, natural gas, and the like. In addition to carbon and hydrogen, such fuels may contain oxygen, moisture, and/or contaminants. As such, the combustion of such fuels may result in the production of a gas stream containing contaminants in the form of ash, carbon dioxide ($CO_2$), sulfur compounds (often in the form of sulfur oxides, referred to as "SOx"), nitrogen compounds (often in the form of nitrogen oxides, referred to as "NOx"), chlorine, mercury, and/or trace elements.

To facilitate removing the contaminants from the gas stream, at least some known power plants may use capture systems that attempt to capture contaminants prior to an exhaust stream being released into the atmosphere. For example, some known power plants use carbon capture systems that attempt to capture carbon dioxide ($CO_2$) post combustion and store it underground to reduce an amount of $CO_2$ released into the atmosphere. However, because of the power required for the carbon capture process, the process of carbon capture may decrease the overall efficiency of the power plant, and/or limit the power production of the power plant. Thus, at least some of such power plant systems operate at a decreased power production efficiency.

BRIEF DESCRIPTION

In one aspect, a combined cycle power plant including a gas turbine engine having a compressor inlet and a turbine outlet that discharges a first exhaust gas stream therefrom is provided. A heat recovery steam generator is downstream from the turbine, wherein the heat recovery steam generator is configured to receive the first exhaust gas stream, extract heat from the first exhaust gas stream, and discharge a second exhaust gas stream therefrom. A steam turbine is configured to discharge a steam stream therefrom. A carbon capture system is downstream from the steam turbine and is oriented to receive the steam stream. A recirculation blower is coupled downstream from the heat recovery steam generator and is configured to pressurize a portion of the second exhaust gas stream for recirculation towards the compressor inlet. An air inlet blower is configured to pressurize an airflow stream channeled towards the compressor inlet, such that a pressurized mixed flow stream is formed from the portion of the second exhaust gas stream and the airflow stream, prior to the mixture entering the compressor inlet. An air inlet blower is configured to pressurize an airflow stream channeled towards the compressor inlet, such that a pressurized mixed flow stream is formed from the portion of the second exhaust gas stream and the airflow stream, prior to the mixture entering the compressor inlet.

In yet another aspect, a combined cycle power plant including a gas turbine engine having a compressor inlet and a turbine outlet discharges a first exhaust gas stream therefrom is provided. A heat recovery steam generator is downstream from the turbine and is configured to receive the first exhaust gas stream, extract heat from the first exhaust gas stream, and discharge a second exhaust gas stream therefrom. A steam turbine is configured to discharge a steam stream therefrom. A carbon capture system is downstream from the steam turbine and is oriented to receive the steam stream. A first cooler is between the heat recovery steam generator and the carbon capture system. The first cooler is configured to facilitate cooling the second exhaust gas stream channeled towards the carbon capture system, thereby defining a third exhaust gas stream. A recirculation blower is configured to pressurize a portion of the third exhaust gas stream for recirculation towards the compressor inlet. An air inlet blower is configured to pressurize an airflow stream channeled towards the compressor inlet, such that a pressurized mixed flow stream is formed from the portion of the third exhaust gas stream and the airflow stream prior to the mixture entering the compressor inlet.

DETAILED DESCRIPTION

The embodiments described herein relate to power generation systems that use pressurized exhaust gas recirculation to enhance plant output. The basic idea is to boost the gas turbine compressor inlet pressure (i.e., supercharging) using both pressurized inlet air and pressurized exhaust gas recirculation. The boost provided to the compressor facilitates increasing gas turbine power output to a level that is sufficient to at least counterbalance both blower fan power consumption and steam cycle losses from steam export to a carbon capture system. In one embodiment, only the fans for the inlet air and exhaust gas recirculation pressurization are used, thus enabling the gas turbine exhaust and heat recovery steam generator (HRSG) exhaust to be modestly pressurized to mitigate the need for an additional blower fan to pressurize the feed to an absorption tower downstream from the HRSG. In an alternative embodiment, an additional or third fan may be used to pressurize the feed to the carbon capture system, or may be used as an induced draft fan at the exhaust. Thus, the systems described herein facilitate recovering plant output lost as exhaust gas is recirculated to the gas turbine inlet.

Unless otherwise indicated, approximating language, such as "generally," "substantially," and "about," as used herein indicates that the term so modified may apply to only an approximate degree, as would be recognized by one of ordinary skill in the art, rather than to an absolute or perfect degree. Accordingly, a value modified by a term or terms such as "about," "approximately," and "substantially" is not to be limited to the precise value specified. In at least some instances, the approximating language may correspond to the precision of an instrument for measuring the value. Additionally, unless otherwise indicated, the terms "first," "second," etc. are used herein merely as labels, and are not intended to impose ordinal, positional, or hierarchical requirements on the items to which these terms refer. Moreover, reference to, for example, a "second" item does not require or preclude the existence of, for example, a "first" or lower-numbered item or a "third" or higher-numbered item.

Figure 1:
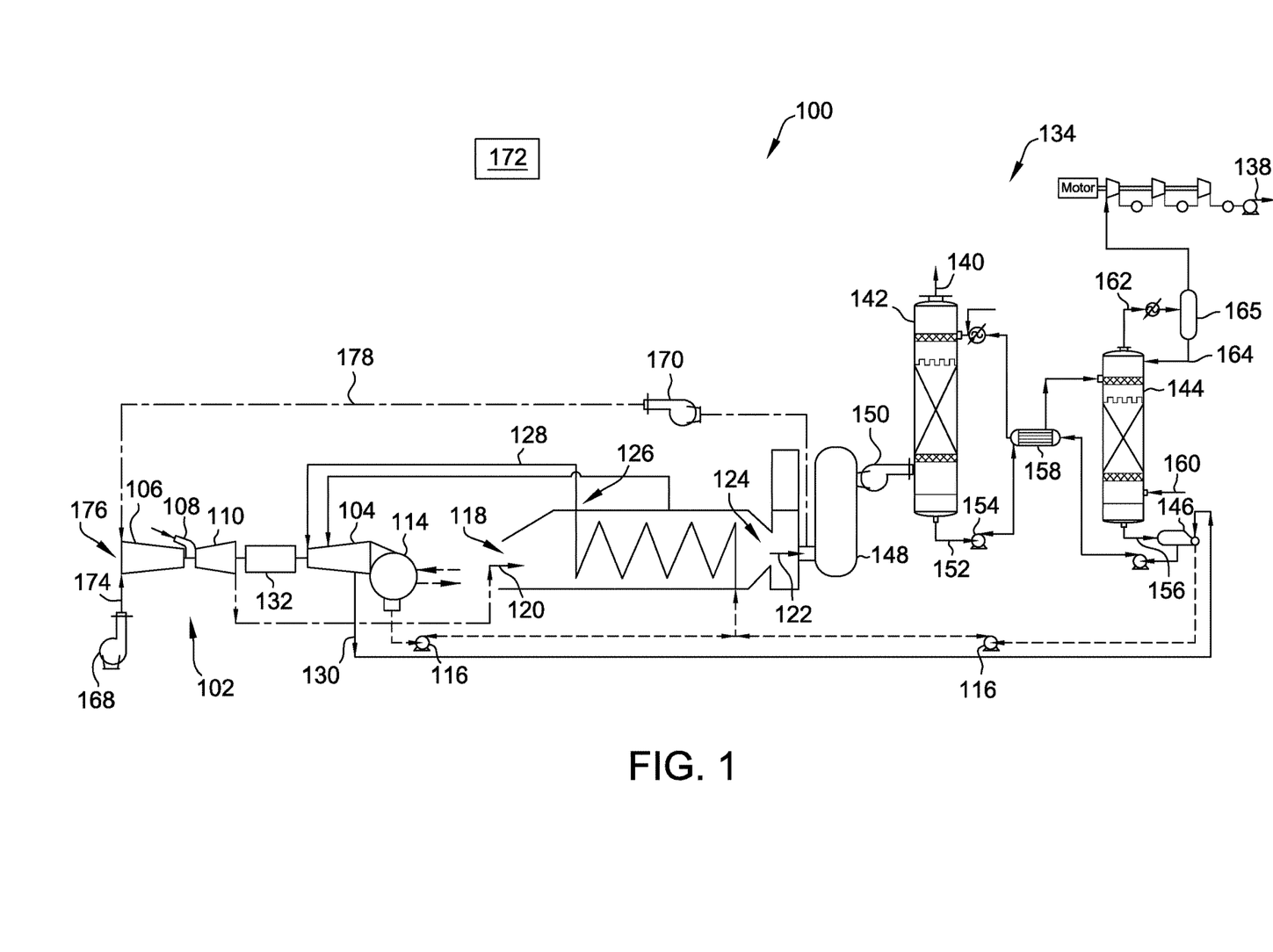
FIG. 1 is a schematic illustration of an exemplary combined cycle power plant.

FIG. 1 is a schematic illustration of an exemplary combined cycle power plant 100. In the exemplary embodiment, power plant 100 includes a gas turbine 102 and a steam turbine 104. Gas turbine 102 includes a compressor 106, a combustor 108, and a turbine 110 coupled together in a serial flow relationship. In operation, combustor 108 receives air from compressor section 106 and fuel from a fuel supply and uses the fuel and air to create a fuel-air mixture that is combusted to generate combustion gases. Combustion gases are channeled through turbine 110 and discharged from turbine 110. In the exemplary embodiment, power plant 100 also includes a steam cycle arrangement including a heat recovery steam generator (HRSG) 112 and steam turbine 104. In some embodiments, the steam cycle arrangement may also include other components, including a condenser 114 and at least one circulation pump 116.

HRSG 112 includes an inlet 118 that is oriented and sized to receive a first exhaust gas stream 120 from gas turbine 102. Heat is extracted from first exhaust gas stream 120, and a second exhaust gas stream 122 is discharged via a first outlet 124, at a lower temperature than a temperature of the first exhaust gas stream 120. HRSG 112 also includes a second outlet 126 that discharges a first steam stream 128. Steam turbine 104 receives the first steam stream 128 and subsequently discharges a circulation flow 130 therefrom. In some embodiments, steam turbine 104 may include additional pressure steam turbines downstream therefrom. In the exemplary embodiment, gas turbine 102 and steam turbine 104 are each coupled to a generator 132 used to generate power therefrom.

In the exemplary embodiment, power plant 100 also includes a carbon capture system 134. During operation, carbon capture system 134 produces a carbon depleted exhaust stream 140 and a carbon dioxide stream 138. Carbon capture system 134 may include one or more separators, either used alone, or in combination with other separation processes, such as carbon dioxide selective membrane technologies, adsorption processes, diaphragms, and/or the like. Exhaust stream 140 may be discharged from carbon capture system 134 to the ambient environment. In some other embodiments, exhaust stream 140 is further processed prior to discharge to the environment or elsewhere. At least a portion of carbon dioxide stream 138 may be channeled to supercritical pressure for transport and/or storage, for example.

Carbon capture system 134 generally includes an absorber 142, a stripper 144, and a reboiler 146. In operation, second exhaust gas stream 122 discharged from HRSG 112 is channeled towards absorber 142. The exhaust gas 122 may be pretreated for removal of particulates and impurities such as SOx and NOx before entry into absorber 142. In addition, in the exemplary embodiment, a first cooler 148 and a booster blower 150 are coupled between HRSG 112 and carbon capture system 134. First cooler 148, such as a quench tower, cools a portion of exhaust gas stream 122 to be channeled towards carbon capture system 134. Booster blower 150 pressurizes this portion of stream 122 prior to it being channeled towards carbon capture system 134 and facilitates controlling a pressure within carbon capture system 134.

A solvent 152, rich in carbon dioxide, is discharged from the bottom of absorber 142 and is then channeled, via a pump 154, to stripper 144. A solvent 156 lean in carbon dioxide is also discharged from the bottom of stripper 144 and is channeled back to an upper portion of absorber 142 via reboiler 146, a pump 166, and heat exchanger 158. Absorber 142 may be of any construction typical for providing gas-liquid contact and absorption. Absorber 142 and stripper 144 may incorporate a variety of internal components, such as trays, packings, and/or supports, for example. In one embodiment, absorber 142 absorbs carbon dioxide via a countercurrent flow from the entering exhaust gas. Stripper 144 removes carbon dioxide from solvent 152. Absorber 142 and stripper 144 may be variably-sized based on the desired amount of carbon dioxide to be removed, and may be sized based on various engineering design equations. Furthermore, a single stripper 144 may serve multiple absorbers 142.

In the exemplary exhibit, the solvent may be a solution or dispersion, typically in water, of one or more absorbent compounds, that is, compounds which in water may create an absorbent fluid that, as compared to water alone, increases the ability of the absorbent fluid to preferentially remove carbon dioxide from exhaust gas. For example, the solvent may be, but is not limited to, monethanolamine (MEA). Inhibitors may be included in the solvent to inhibit degradation of the solvent.

In the exemplary embodiment, solvent 152 is preheated in a countercurrent heat exchanger 158 against solvent 156, and is subsequently supplied to an upper portion of stripper 144. Stripper 144 is a pressurized unit in which carbon dioxide is recovered from solvent 152. Stripper 144 generally incorporates reboiler 146 which receives a portion of solvent 156 exiting the bottom portion of stripper 144. Reboiler 146 vaporizes solvent 156 and channels solvent vapor 160 to stripper 144 to increase carbon dioxide separation. A single stripper may include more than one reboiler 146. Reboiler 146 receives steam, such as from circulation flow, channeled from steam turbine 104 to provide heating duty in reboiler 146.

Vapor 162 exiting the top of stripper 144 is partially condensed in an overhead condenser 165. The condensed portion of vapor 162 is returned back to stripper 144 as reflux 164. Reflux 164 may be transferred through an accumulator (not shown) and a pump (not shown) before entry into stripper 144. Carbon dioxide gas stream 138 is removed from condenser 165 for transport and/or storage.

In the exemplary embodiment, power plant 100 also includes an air inlet blower 168, a recirculation blower 170, and a controller 172. Air inlet blower 168 pressurizes an airflow stream 174 channeled towards an inlet 176 of compressor 106. In this embodiment, a portion of second exhaust gas stream 122 is also recirculated towards inlet 176 as an exhaust gas recirculation stream 178. Recirculation blower 170 pressurizes exhaust gas recirculation stream 178 before it enters inlet 118 of compressor 106. In some embodiments, airflow stream 174 and exhaust gas recirculation stream 178 are combined and mixed to form a pressurized mixed flow stream (not shown) prior to the mixture entering the compressor inlet. Thus, the boost provided to the compressor inlet facilitates increasing the power density of power plant 100.

However, power consumption from the operation of blowers 150, 168, and 170 may also result in a decrease in plant efficiency. It is believed, without being bound by any particular theory, that the pressurization provided at inlet 118 provides an improvement to the output of power plant 100 that is greater than any decrease in efficiency caused by blower power consumption and steam cycle losses that may result during the operation of power plant 100.

In the exemplary embodiment, power plant 100 also includes a controller 172 that monitors and/or controls the operation of power plant 100. For example, controller 172 may monitor the power consumption of blowers 150, 168, and/or 170, and may also determine steam cycle losses resulting from discharging stream 130 towards carbon capture system 134, for example. Controller 172 may also dynamically determine the power consumption and steam cycle losses, and adjust operation of power plant 100 accordingly. Accordingly, in one embodiment, operation of blowers 150, 168 and/or 170 is variably adjusted by controller 172 to facilitate improving plant output, as a result of the boost provided to compressor 106, to a degree that overcomes power consumption and steam cycle losses. That is, controller 172 may modulate the flow of exhaust gas recirculation stream 178 and/or airflow stream 174 channeled towards the compressor inlet to provide an improvement to the output of power plant 100 that is greater than any losses caused by the blower power consumption and the steam cycle losses. In the exemplary embodiment, the size of blowers 150, 168, and/or 170, and/or the overall size of the recirculation line are variably selected to facilitate providing a predetermined desired mixture with minimal control action at base load, i.e., full boost. Modulating blower speed and/or varying a position of blower guide vanes (not shown) facilitates managing flow and reducing boost as power is reduced. At and below at least some reduced loads, at least one blower 168, 170, 175 (shown in FIG. 5) and/or possibly 190 (shown in FIG. 6) may be deenergized such that recirculation flow control is facilitated via the dampers in the EGR ducts. In the exemplary embodiment, plant output is generally proportional to total fuel burned, which is constrained by gas flow at the compressor inlet. Boosting inlet pressure above atmospheric pressure with the EGR and the inlet blowers 168, and/or 170 or 175 facilitates providing a substantially linear increase in gas flow through the compressor and to the combustor, thus resulting in a linear increase in power output. More generally, such actions are analogous to operating the plant at a physically lower altitude where the density of the air is higher than at sea level or the actual density at the plant location.

Figure 2:
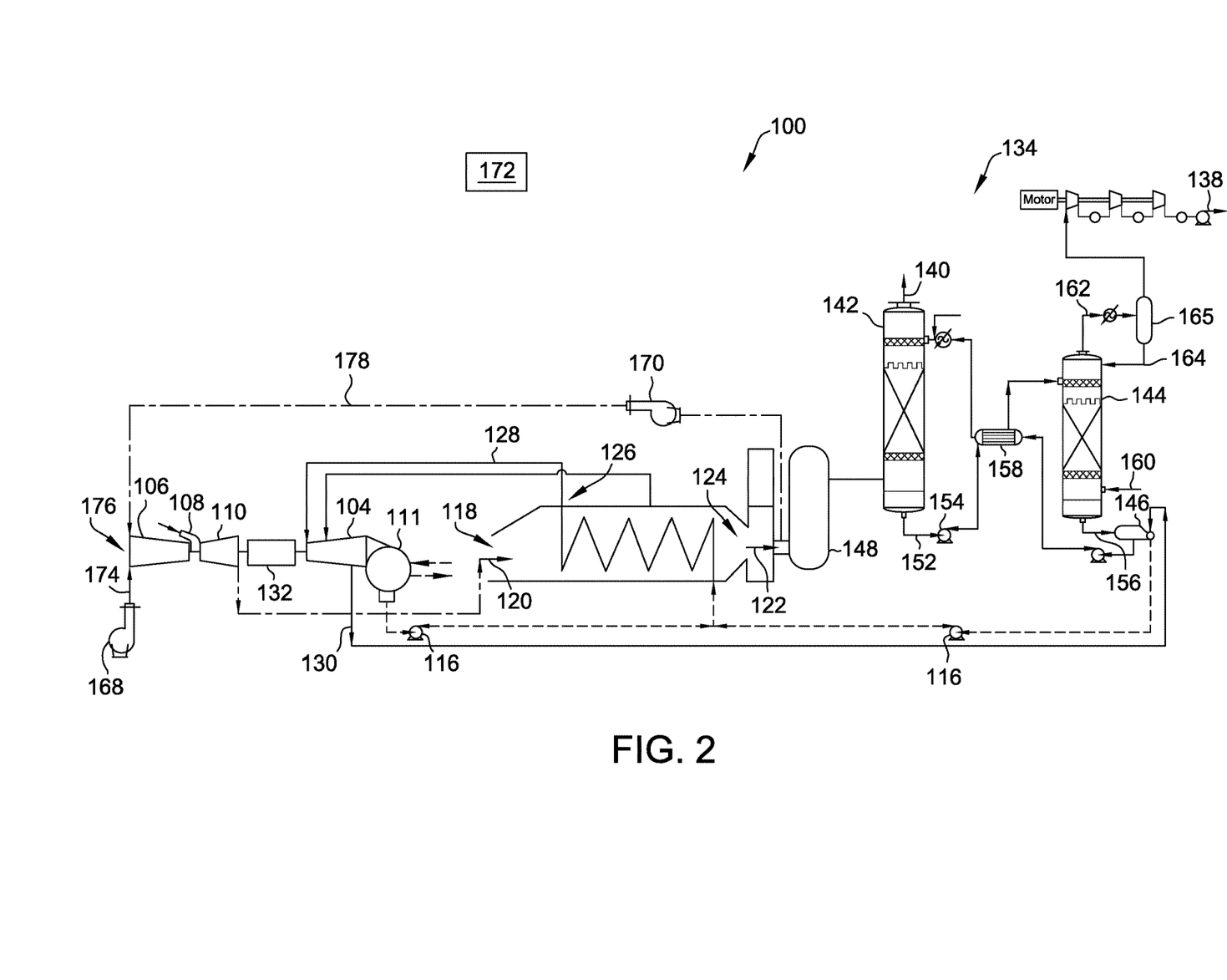
FIG. 2 is a schematic illustration of another exemplary combined cycle power plant.

FIG. 2 is a schematic illustration of another exemplary combined cycle power plant 100. In the exemplary embodiment, power plant 100 includes air inlet blower 168 and recirculation blower 170, but does not include booster blower 150 (shown in FIG. 1). In the embodiment illustrated in FIG. 1, the inclusion of blower 150 is a function of the design internal pressure capability of the HRSG, GT exhaust ducting, and absorber 142, and the draft loss through this equipment to discharge of clean exhaust to atmosphere at 140. In FIG. 2, the exhaust system of plant 100 has been designed for operation at a slightly increased pressure as compared to the plant 100 shown in FIG. 1, and as such, the blower 150 can be eliminated to facilitate simplifying the system and improving reliability. Performance should generally also be somewhat better in the embodiment illustrated in FIG. 2 since the power lost in the turbine expander 110 should be less than the power that would be consumed by including blower 150. As a result, power output is facilitated to be increased in the embodiment of FIG. 2 as a result of the compressor boost.

Figure 3:
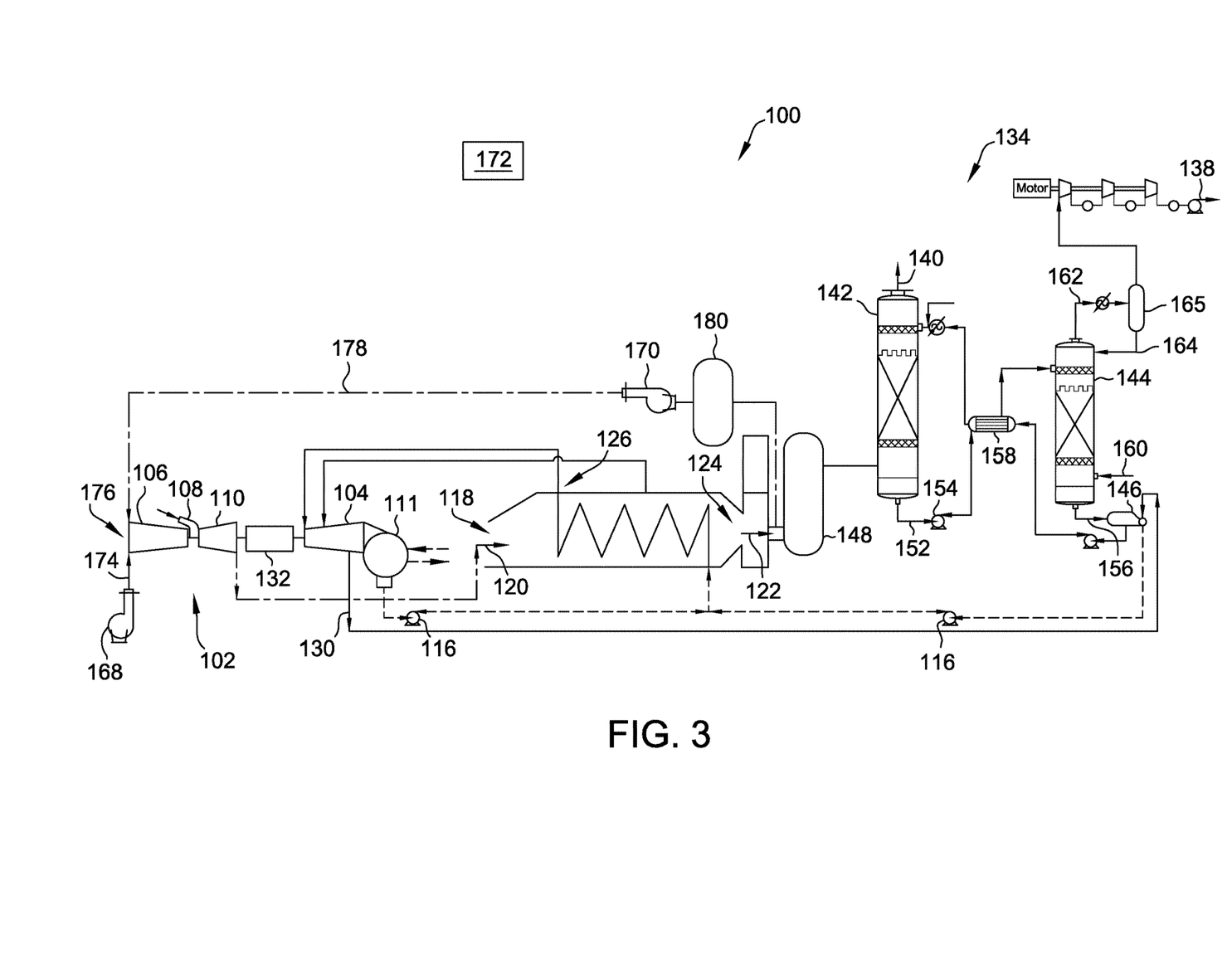
FIG. 3 is a schematic illustration of another exemplary combined cycle power plant.
Figure 4:
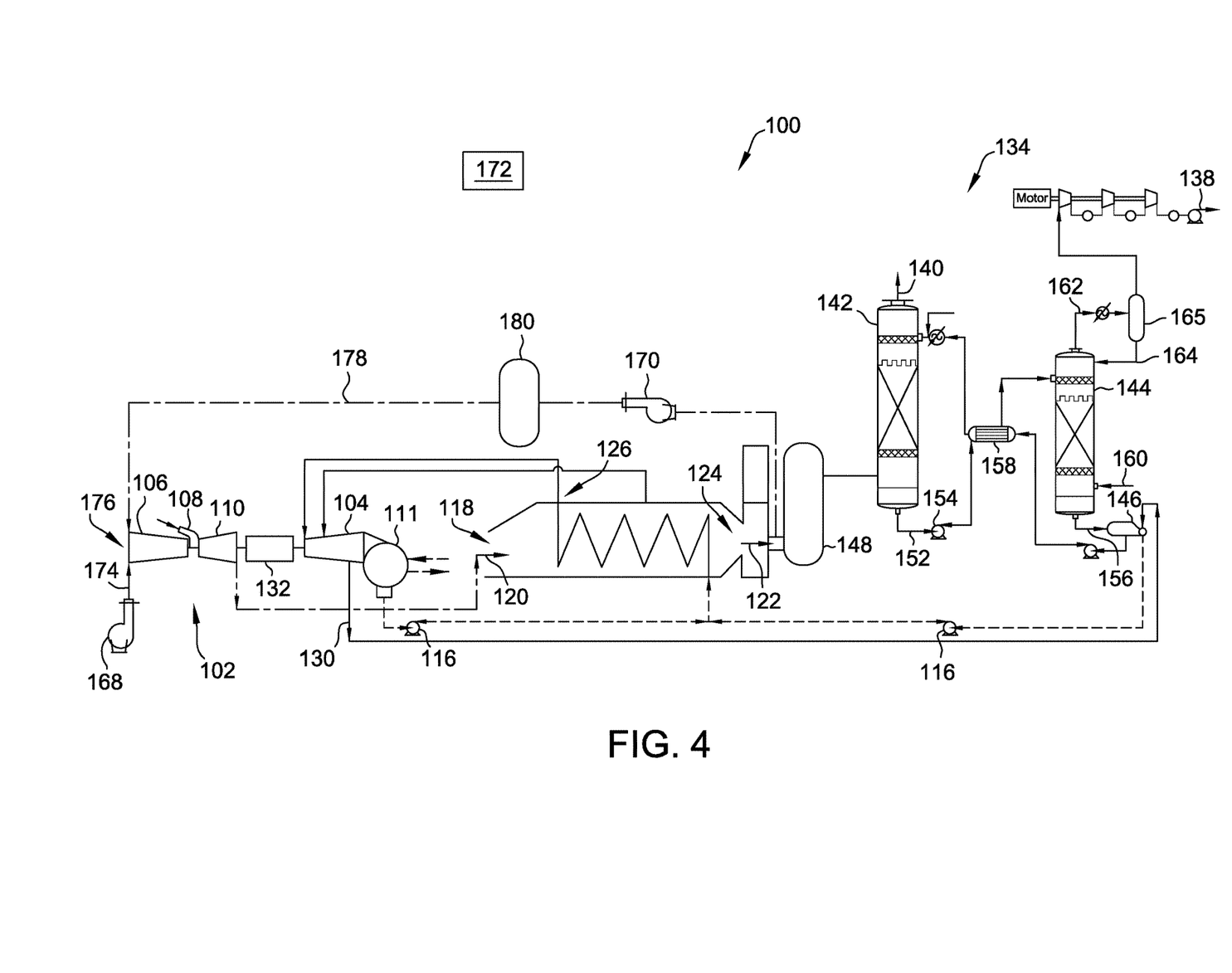
FIG. 4 is a schematic illustration of yet another exemplary combined cycle power plant.

FIGS. 3 and 4 are schematic illustrations of other exemplary combined cycle power plants 100. In the exemplary embodiments, power plant 100 includes a second cooler 180, such as a quench tower, that facilitates cooling exhaust gas recirculation stream 178 before stream 178 enters the compressor inlet. Providing independent control of EGR gas temperature to inlet 176 via cooler 180, and to adsorber 142 via cooler 148, facilitates optimizing a temperature of each stream. Second cooler 180 may be between HRSG 112 and recirculation blower 170, as illustrated in FIG. 3, or alternatively be positioned between recirculation blower 170 and the compressor inlet, as illustrated in FIG. 4. Positioning second cooler 180 between recirculation blower 170 and the compressor inlet facilitates mitigating any temperature increase to exhaust gas recirculation stream 178 due to the pressurization induced by recirculation blower 170. Although the additional equipment increases the cost and complexity of plant 100, those costs are outweighed by the benefit of the inclusion of cooler 180, either before or after blower 170 as supplying a cooler mixed inlet gas temperature to compressor 106 is beneficial to power output, (due to denser gas, thus reducing the required boost pressure for the same plant output, for example. The cooling also facilitates reducing moisture in the EGR stream through condensation.

Figure 5:
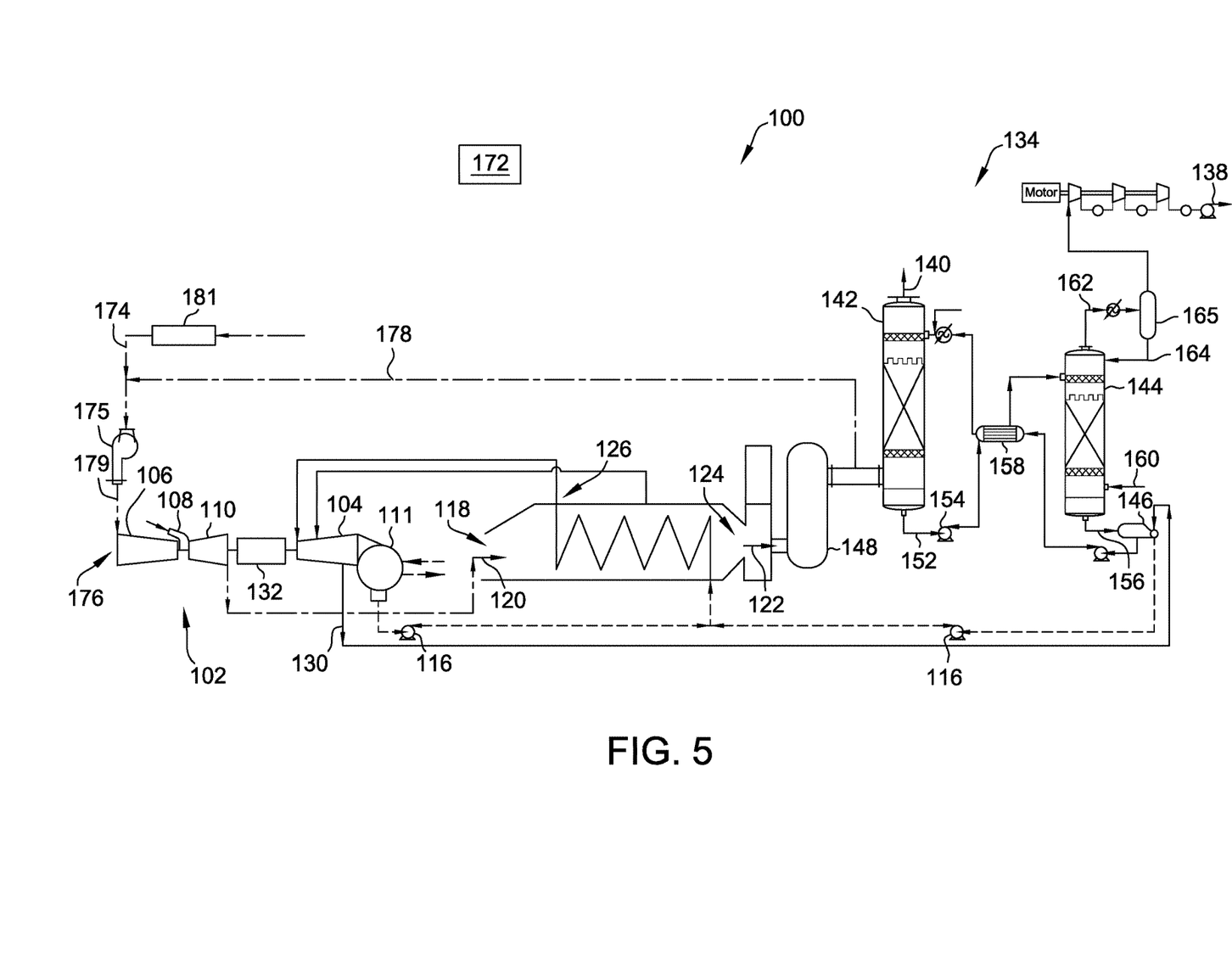
FIG. 5 is a schematic illustration of a further exemplary combined cycle power plant.
Figure 6:
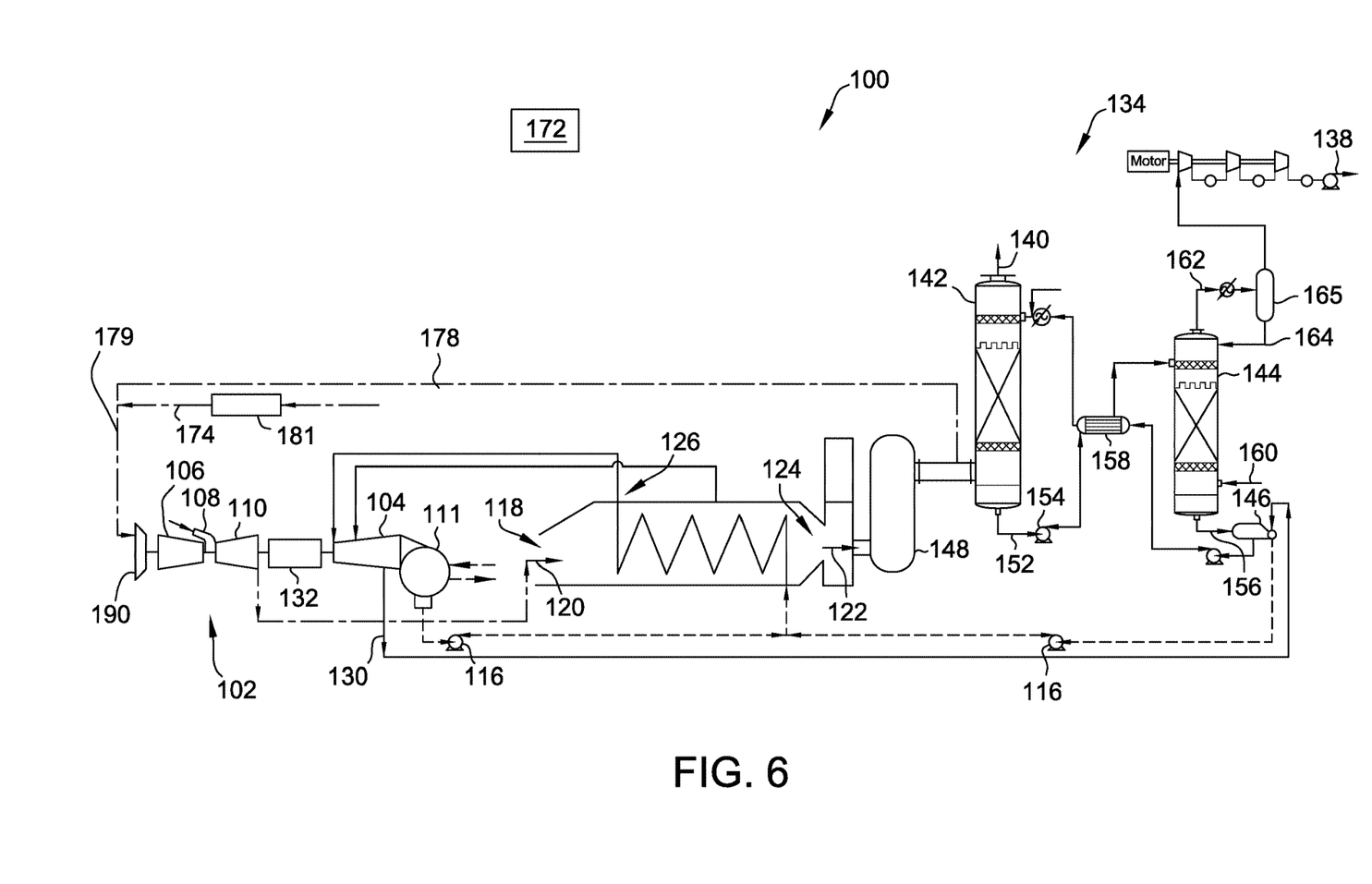
FIG. 6 is a schematic illustration of another exemplary combined cycle power plant.

FIGS. 5 and 6 are schematic illustrations of other exemplary combined cycle power plants 100. More specifically, in the exemplary embodiment shown in FIG. 5, power plant 100 pressurizes exhaust gas recirculation stream 178 and inlet airflow stream 174 in a single boost blower or compressor 175 prior to the combined flow 179 entering the compressor inlet. The use of blower 175 facilitates increasing net plant output. In the exemplary embodiment, inlet airflow stream 174 flows through an inlet filter 181 prior to the stream 174 being combined with exhaust gas recirculation stream 178. Although the additional equipment may increase the complexity of plant 100, those costs are outweighed by the benefit of reducing the number of blowers used by plant 100. In addition, the single blower 175 facilitates placement flexibility as to its location relative to the compressor inlet, including for example, additional inlet conditioning before the recirculation stream 178 enters the compressor inlet. Furthermore, depending on the operating conditions of the plant 100, a single blower 175 may facilitate reduced costs, maintenance, and or accessibility. Moreover, as with the other blowers used in plant 100 in each embodiment described herein, blower 175 can be deenergized depending on plant load requirements. In this embodiment, the exhaust recirculation supply connection downstream from cooler 148 facilitates cooling of exhaust stream 148 prior to stream entering absorber 142 and/or the turbine inlet via steam 178. Such an orientation facilitates reducing and/or simplifying the complexity of the exhaust system of plant 100.

In the embodiment shown in FIG. 6, blower 175 (shown in FIG. 5) has been removed, and a compressor with a shaft-driven boost blower 190 has been included to pressurize flow 179. In one embodiment, blower 190 includes a gear to reduce its speed versus the power train. Although blower 190 reduces the options for inlet gas treatment after the blower, blower 190 does compact plant 100 as compared to other embodiments as blower 190 is coupled in close proximity to the main compressor inlet 106. In addition, an axial, shaft-driven compressor facilitates improving overall plant efficiency by eliminating motor losses and because its design generally has higher efficiency entitlement as compared to known standalone blowers. Moreover, a dedicated shaft-driven booster also facilitates increasing the design flexibility to optimize the boost pressure and increase the overall plant power, though it is more difficult to deenergize such a booster a lower plant loads where the power boost is not needed.

The embodiments described herein relate to power generation systems using pressurized exhaust gas recirculation to enhance plant output. The boost provided to the gas turbine compressor inlet pressure with both pressurized inlet air and pressurized exhaust gas recirculation facilitates increasing gas turbine power output that is sufficient to at least counterbalance both blower fan power consumption and steam cycle losses from steam export to a carbon capture system. For example, the boost increases the power density for the power plant which should provide an improvement on a $/kW basis. Modulating the boost provided by the blowers described herein thus provides a knob that can be used to enhance part load performance.

Further aspects of the present disclosure are provided by the subject matter of the following clauses:

1. A combined cycle power plant comprising: a gas turbine engine comprising a compressor inlet and a turbine outlet that discharges a first exhaust gas stream therefrom; a heat recovery steam generator downstream from the turbine, the heat recovery steam generator configured to: receive the first exhaust gas stream; extract heat from the first exhaust gas stream to generate steam; and discharge a second exhaust gas stream therefrom; a steam turbine oriented to receive steam from the heat recovery steam generator and discharge a steam stream therefrom; a carbon capture system downstream from the steam turbine and oriented to receive the steam stream; a recirculation blower coupled downstream from the heat recovery steam generator and configured to pressurize a portion of the second exhaust gas stream for recirculation towards the compressor inlet; and an air inlet blower configured to pressurize an airflow stream channeled towards the compressor inlet, such that a pressurized mixed flow stream is formed from the portion of the second exhaust gas stream and the airflow stream, prior to the mixture entering the compressor inlet.

2. The combined cycle power plant in accordance with clause 1 further comprising a controller configured to: monitor power consumption of the recirculation blower and the air inlet blower; determine steam cycle losses resulting from discharging the steam stream towards the carbon capture system; and modulate the flow of the exhaust gas stream recirculated towards the compressor inlet to facilitate improving operation of the combined cycle power plant.

3. The combined cycle power plant in accordance with any preceding clause further comprising a first cooler coupled between the heat recovery steam generator and the carbon capture system, the first cooler configured to facilitate cooling the second exhaust gas stream channeled towards the carbon capture system.

4. The combined cycle power plant in accordance with any preceding clause further comprising a booster blower coupled in flow communication with the first cooler, the booster blower configured to pressurize the second exhaust gas stream channeled towards the carbon capture system.

5. The combined cycle power plant in accordance with any preceding clause further comprising a second cooler configured to facilitate cooling the portion of the second exhaust gas stream recirculated towards the compressor inlet.

6. The combined cycle power plant in accordance with any preceding clause, wherein the second cooler is between the heat recovery steam generator and the recirculation blower.

7. The combined cycle power plant in accordance with any preceding clause, wherein the second cooler is between the recirculation blower and the compressor inlet.

8. A combined cycle power plant comprising: a gas turbine engine comprising a compressor inlet and a turbine outlet oriented to discharge a first exhaust gas stream therefrom; a heat recovery steam generator downstream from the turbine, the heat recovery system generator configured to: receive the first exhaust gas stream; extract heat from the first exhaust gas stream to generate steam; and discharge a second exhaust gas stream therefrom; a recirculation blower downstream from the heat recovery steam generator and configured to pressurize a portion of the second exhaust gas stream for recirculation towards the compressor inlet; and an air inlet blower configured to pressurize an airflow stream channeled towards the compressor inlet, such that a pressurized mixed flow stream is formed from the portion of the second exhaust gas stream and the airflow stream prior to the mixture entering the compressor inlet.

9. The combined cycle power plant in accordance with the preceding clause further comprising: a steam turbine configured to discharge a steam stream therefrom; and a carbon capture system downstream from the steam turbine and oriented to receive the steam stream.

10. The combined cycle power plant in accordance with any preceding clause further comprising a controller configured to: monitor power consumption of the recirculation blower and the air inlet blower; determine steam cycle losses resulting from discharging the steam stream towards the carbon capture system; and modulate at least one of the flow and the temperature of the exhaust gas stream recirculated towards the compressor inlet to facilitate improving operation of the combined cycle power plant.

11. The combined cycle power plant in accordance with any preceding clause further comprising a first cooler coupled between the heat recovery steam generator and the carbon capture system, the first cooler configured to facilitate cooling the second exhaust gas stream channeled towards the carbon capture system.

12. The combined cycle power plant in accordance with any preceding clause further comprising a booster blower coupled in flow communication with the first cooler, the booster blower configured to pressurize the second exhaust gas stream for channeling towards the carbon capture system.

13. The combined cycle power plant in accordance with any preceding clause further comprising a second cooler configured to facilitate cooling the portion of the second exhaust gas stream recirculated towards the compressor inlet.

14. The combined cycle power plant in accordance with any preceding clause, wherein the second cooler is between the heat recovery steam generator and the recirculation blower.

15. The combined cycle power plant in accordance with any preceding clause, wherein the second cooler is between the recirculation blower and the compressor inlet.

16. A combined cycle power plant comprising: a gas turbine engine comprising a compressor inlet and a turbine outlet that discharges a first exhaust gas stream therefrom; a heat recovery steam generator downstream from the turbine, the heat recovery system steam generator configured to: receive the first exhaust gas stream; extract heat from the first exhaust gas stream to generate steam; and discharge a second exhaust gas stream therefrom; a steam turbine configured to discharge a steam stream therefrom; a carbon capture system downstream from the steam turbine and oriented to receive the steam stream; a first cooler between the heat recovery steam generator and the carbon capture system, the first cooler configured to facilitate cooling a first portion of the second exhaust gas stream channeled towards the carbon capture system, thereby defining a third exhaust gas stream; a recirculation blower coupled downstream from the heat recovery steam generator and configured to pressurize a second portion of the second exhaust gas stream for recirculation towards the compressor inlet; and an air inlet blower configured to pressurize an airflow stream channeled towards the compressor inlet, such that a pressurized mixed flow stream is formed from the second portion of the second exhaust gas stream and the airflow stream prior to the mixture entering the compressor inlet.

17. The combined cycle power plant in accordance with the preceding clause further comprising a controller configured to: monitor power consumption of the recirculation blower and the air inlet blower; determine steam cycle losses resulting from discharging the steam stream towards the carbon capture system; and modulate one of a flow and a temperature of the exhaust gas stream recirculated towards the compressor inlet to facilitate increasing net output of the combined cycle power plant in excess of the blower power consumption and the steam cycle losses.

18. The combined cycle power plant in accordance with any preceding clause further comprising a second cooler configured to facilitate cooling the second portion of the second exhaust gas stream recirculated towards the compressor inlet.

19. The combined cycle power plant in accordance with any preceding clause, wherein the second cooler is between the heat recovery steam generator and the recirculation blower.

20. The combined cycle power plant in accordance with any preceding clause, wherein the second cooler is between the recirculation blower and the compressor inlet.

The above description is meant to be exemplary only, and one skilled in the art will recognize that changes may be made to the embodiments described without departing from the scope of the invention disclosed. Modifications, which fall within the scope of the present invention, will be apparent to those skilled in the art, in light of a review of this disclosure, and such modifications are intended to fall within the appended claims.

Although specific features of various embodiments of the invention may be shown in some drawings and not in others, this is for convenience only. Moreover, references to "one embodiment" in the above description are not intended to be interpreted as excluding the existence of additional embodiments that also incorporate the recited features. In accordance with the principles of the invention, any feature of a drawing may be referenced and/or claimed in combination with any feature of any other drawing.

While the invention has been described in terms of various specific embodiments, those skilled in the art will recognize that the invention can be practiced with modification within the spirit and scope of the claims.

What is claimed is:

1. A combined cycle power plant comprising:
a gas turbine engine comprising a compressor inlet and a turbine outlet that discharges a first exhaust gas stream therefrom;
a heat recovery steam generator downstream from the turbine, the heat recovery steam generator configured to:
receive the first exhaust gas stream;
extract heat from the first exhaust gas stream to generate steam; and
discharge a second exhaust gas stream therefrom; and
a steam turbine oriented to receive steam from the heat recovery steam generator and discharge a steam stream therefrom;
a carbon capture system downstream from the steam turbine and oriented to receive the steam stream;
a recirculation blower coupled downstream from the heat recovery steam generator and configured to pressurize a portion of the second exhaust gas stream for recirculation towards the compressor inlet;
an air inlet blower configured to pressurize an airflow stream channeled towards the compressor inlet, creating a pressurized mixed flow stream formed from the pressurized portion of the second exhaust gas stream combined with the pressurized airflow stream; and
a controller configured to:
monitor power consumption of the recirculation blower;
monitor power consumption of the air inlet blower;
determine steam cycle losses from discharging steam to the carbon capture system; and
modulate the flow of the exhaust gas stream recirculated towards the compressor inlet based on the monitored power consumption of the recirculation blower, the monitored power consumption of the air inlet blower, and the determined steam cycle losses to facilitate increasing the total power output of the combined power plant.

2. The combined cycle power plant in accordance with claim 1 further comprising a first cooler coupled between the heat recovery steam generator and the carbon capture system, the first cooler configured to facilitate cooling the second exhaust gas stream channeled towards the carbon capture system.

3. The combined cycle power plant in accordance with claim 2 further comprising a booster blower coupled in flow communication with the first cooler, the booster blower configured to pressurize the second exhaust gas stream channeled towards the carbon capture system.

4. The combined cycle power plant in accordance with claim 1 further comprising a second cooler configured to facilitate cooling the portion of the second exhaust gas stream recirculated towards the compressor inlet.

5. The combined cycle power plant in accordance claim 4, wherein the second cooler is between the heat recovery steam generator and the recirculation blower.

6. The combined cycle power plant in accordance with claim 4, wherein the second cooler is between the recirculation blower and the compressor inlet.

7. A combined cycle power plant comprising:
a gas turbine engine comprising a compressor inlet and a turbine outlet oriented to discharge a first exhaust gas stream therefrom;
a heat recovery steam generator downstream from the turbine, the heat recovery steam generator configured to:

receive the first exhaust gas stream;
extract heat from the first exhaust gas stream to generate steam; and
discharge a second exhaust gas stream therefrom; and
a carbon capture system oriented to receive a steam;
a recirculation blower downstream from the heat recovery steam generator and configured to pressurize a portion of the second exhaust gas stream for recirculation towards the compressor inlet;
an air inlet blower configured to pressurize an airflow stream channeled towards the compressor inlet, creating a pressurized mixed flow stream formed from the pressurized portion of the second exhaust gas stream combined with the pressurized airflow stream; and
a controller configured to:
monitor power consumption of the recirculation blower;
monitor power consumption of the air inlet blower;
determine steam cycle losses from discharging steam to the carbon capture system; and
modulate the flow of the exhaust gas stream recirculated towards the compressor inlet based on the monitored power consumption of the recirculation blower, the monitored power consumption of the air inlet blower, and the determined steam cycle losses to facilitate increasing the total power output of the combined power plant.

8. The combined cycle power plant in accordance with claim 7 further comprising:
a steam turbine configured to discharge a steam stream therefrom.

9. The combined cycle power plant in accordance with claim 8 further comprising a first cooler coupled between the heat recovery steam generator and the carbon capture system, the first cooler configured to facilitate cooling the second exhaust gas stream channeled towards the carbon capture system.

10. The combined cycle power plant in accordance with claim 9 further comprising a booster blower coupled in flow communication with the first cooler, the booster blower configured to pressurize the second exhaust gas stream for channeling towards the carbon capture system.

11. The combined cycle power plant in accordance with claim 9 further comprising a second cooler configured to facilitate cooling the portion of the second exhaust gas stream recirculated towards the compressor inlet.

12. The combined cycle power plant in accordance with claim 11, wherein the second cooler is between the heat recovery steam generator and the recirculation blower.

13. The combined cycle power plant in accordance claim 11, wherein the second cooler is between the recirculation blower and the compressor inlet.

14. A combined cycle power plant comprising:
a gas turbine engine comprising a compressor inlet and a turbine outlet that discharges a first exhaust gas stream therefrom;
a heat recovery steam generator downstream from the turbine, the heat recovery system steam generator configured to:
receive the first exhaust gas stream;
extract heat from the first exhaust gas stream to generate steam; and
discharge a second exhaust gas stream therefrom; and
a steam turbine configured to discharge a steam stream therefrom;
a carbon capture system downstream from the steam turbine and oriented to receive the steam stream;
a first cooler between the heat recovery steam generator and the carbon capture system, the first cooler configured to facilitate cooling a first portion of the second exhaust gas stream channeled towards the carbon capture system, thereby defining a third exhaust gas stream;
a recirculation blower coupled downstream from the heat recovery steam generator and configured to pressurize a second portion of the second exhaust gas stream for recirculation towards the compressor inlet;
an air inlet blower configured to pressurize an airflow stream channeled towards the compressor inlet, creating a pressurized mixed flow stream formed from the pressurized second portion of the second exhaust gas stream combined with the pressurized airflow stream; and
a controller configured to:
monitor power consumption of the recirculation blower;
monitor power consumption of the air inlet blower;
determine steam cycle losses from discharging steam stream to the carbon capture system; and
modulate one of a flow and a temperature of the exhaust gas stream recirculated towards the compressor inlet to facilitate increasing net output of the combined cycle power plant in excess of the blower power consumption and the steam cycle losses.

15. The combined cycle power plant in accordance with claim 14 further comprising a second cooler configured to facilitate cooling the second portion of the second exhaust gas stream recirculated towards the compressor inlet.

16. The combined cycle power plant in accordance with claim 15, wherein the second cooler is between the heat recovery steam generator and the recirculation blower.

17. The combined cycle power plant in accordance with claim 15, wherein the second cooler is between the recirculation blower and the compressor inlet.

* * * * *